United States Patent [19]

Danner

[11] 4,049,916
[45] Sept. 20, 1977

[54] RING DETECTOR CIRCUIT FOR CENTRALLY LOCATED ANSWERING AND RECORDING EQUIPMENT

[75] Inventor: Dean Wilson Danner, New Berlin, Wis.

[73] Assignee: GTE Automatic Electric Laboratories Incorporated, Northlake, Ill.

[21] Appl. No.: 589,157

[22] Filed: June 20, 1975

[51] Int. Cl.$^2$ ............................................. H04M 1/64
[52] U.S. Cl. .................................. 179/6 C; 179/6 E; 179/84 R
[58] Field of Search ............ 179/6 R, 6 C, 6 E, 84 R, 179/84 L, 2 A

[56] References Cited

U.S. PATENT DOCUMENTS

| | | | |
|---|---|---|---|
| 3,141,931 | 7/1964 | Zarouni | 179/6 E |
| 3,702,904 | 11/1972 | Bard | 179/84 R |
| 3,838,219 | 9/1974 | Mason | 179/2 A |
| 3,842,216 | 10/1974 | Owen | 179/84 L |
| 3,865,986 | 2/1975 | Darwood | 179/6 R |
| 3,875,348 | 4/1975 | Kopec | 179/84 L |
| 3,965,304 | 6/1976 | Marheine | 179/6 R |
| 3,979,560 | 9/1976 | Darwood | 179/6 R |

Primary Examiner—Bernard Konick
Assistant Examiner—Alan Faber
Attorney, Agent, or Firm—Robert J. Black

[57] ABSTRACT

A telephone answering and recording system designed for installation in a centralized location remote from the customer's premises. A single line is employed in normal operation between the customer's telephone equipment and the centrally located answering and recording equipment. Facilities are also included which permit the customer to access the equipment from telephones other than his own regular instrument. The telephone answering and recording equipment includes a ringing signal detection means comprising an optical isolator, a comparator, and a counting means.

7 Claims, 21 Drawing Figures

FIG. 6
C-LEAD MONITOR 600

FIG. 5
REMOTE CKT. 500

FIG. 7
RING COUNT CONNECT 700

FIG. 13 STAND BY TAPE 1300
FIG. 14 ANNC. MOTOR LINE SEIZE 1400
FIG. 15 PROGRAM SEIZE 1500
FIG. 16 POS/PLAY 1600

MID CYCLE SHIFT 1900

TONE OSCILLATOR 1700

FIG. 17

BEGINNING OF TAPE 2000

FIG. 20

FIG. 21 TAPE COUNTER 2100

RING DETECTOR CIRCUIT FOR CENTRALLY LOCATED ANSWERING AND RECORDING EQUIPMENT

BACKGROUND OF THE INVENTION

1. Field of the Invention

The present invention relates to telephone answering systems and more particularly to systems employing call answering and recording equipment located remotely from the telephone subscriber's equipment.

2. Description of the Prior Art

Equipment has frequently been provided in prior art telephone systems for automatically answering calls to customer stations when the called party is not available to do so. Such equipment is usually arranged to answer each call with a recorded announcement, to record any message from the caller and afterward to play back the recorded messages to the called customer. A variety of other features are also usually supplied by this equipment. For example, the customer generally is permitted to record and check his own answer announcement, and to repeat and skip certain passages during the playback period.

To provide these and other features present day equipment is usually located on the customer's premises. As a result installation and maintenance procedures are complicated because telephone company personnel must visit many locations to install and service equipment. In addition the customer desiring such answering service is presented with spaced problems in locating the additional equipment adjacent to telephone. Obviously such conditions increase the cost of service. It has been suggested that in order to reduce the service cost and simplify installation and maintenance procedures, that the answering equipment be located at a telephone central office. While such arrangements overcome to some extent the foregoing objections, the provision of many features of answering service which are frequently requested required by customers is not possible. For instance, the customer is unable to record his own answering announcement, instead he is required to use one prepared by the telephone company while he is given no control over the repeating or skipping of messages during playback. The service is further restricted when the customer can only obtain messages or playback at his own station.

Many of these objections have been overcome by a telephone answering system disclosed in U.S. Pat. No. 3,141,931 to Alfred Zarouni. However the Zarouni patent teaches that each customer who desires telephone answering service be assigned two line appearances in the switching network at the telephone central office. One of these lines is connected to the customer's answering equipment and with the line connected to the customer's station, it is used for ordinary telephone service. The other appearance is connected to the answering equipment by means of an answer and record line. This latter line is a so-called "unlisted" line, that is without a published directory number and is used for allowing the customer to control his answering equipment.

It is obvious of course from the foregoing that the requirement for two telephone lines and the attendant disadvantages thereto are less than desirable. Such disadvantages include cost, service maintenance, etc. as well as the possibility that if a person other than the customer subscribing to such service, discovers the unlisted number, he may be able to playback and monitor messages not intended for him. The system taught by Zarouni obviously lacks the privacy retaining features of prior art answering systems which were located on the customer's own premises.

Accordingly it is the principle object of the present invention to overcome the disadvantages of prior art telephone answering and recording systems and to particularly provide a telephone answering and recording system that may be located in a telephone central office or other centralized location which requires but a single telephone line between the customer's equipment and the centralized location for normal operation, and accordingly provides the same privacy associated with such equipment when it is located at a customer controlled location.

SUMMARY OF THE INVENTION

The answering and recording equipment of the present invention provides a customer-user with automatic answering capability twenty-four hours a day. The system monitors the customer's line and after a predetermined number of rings, if unanswered, answers the telephone with the customer's previously recorded announcement message. It then switches to record a message from the caller. The equipment is located in either a telephone central office or a central location within certain predetermined limits from a telephone central office. In either case however certain isolation equipment is located and included at the telephone central office.

The answering and recording equipment of the present invention incorporates so-called "cassette" magnetic tape cartridges. The outgoing or announcement message is recorded on a cassette type endless loop cartridge while incoming messages are recorded on a cassette type reel-to-reel cartridge. The equipment of the present invention includes such features as a fail-safe circuit to prevent the customer's losing messages while receiving an incoming call during the playback function. Alarm circuitry is provided to monitor the equipment for trouble.

In the arrangement taught by the present invention the customer can dictate an announcement from his own telephone set. This announcement may be either an answer and record announcement or answer only announcement. Answer only announcements are normally limited to light duty such as vacation type answer only messages, it being recommended that heavy duty answer only machines be employed if that is the prime requisite of the customer. In the present arrangement, the standard announcement may vary in length from five to twenty-five seconds. By simple modification even longer lengths of answer messages may be employed. The present equipment is arranged to time the caller and shut off after a preset amount of recording time. This time is adjustable from 30 to 60 seconds depending upon the customer's needs, and is independent of the length of the recorded announcement.

It is also possible that the present equipment employs as an option a voice control circuit. This circuit permits the calling party to record for a maximum recording period of 30 minutes. However if the caller does not speak for a predetermined period (such as 12 seconds) the equipment will be disconnected.

Another feature included in the present equipment is the inclusion of an automatic reset feature that places the recording equipment in a fast forward mode so as to advance the incoming tape to the end of all new messages. This reset takes place if the telephone line is lost or if the customer answers an incoming call during the playback function. During the automatic answer and/or recording cycles the customer's telephone line is monitored. If the telephone set goes off-hook, the equipment will be disconnected from the line preventing the recording of two-way conversations. Another feature included in the present equipment is calling party control. This feature permits the equipment to go on-hook as soon as the calling party goes on-hook. For this reason the central office employed with this arrangement must be of the calling party release type through the connector or terminating junctor. Incoming messages, retrieved messages, or dictation announcements all employ the same telephone line to which the telephone answering and recording equipment of the present invention is connected. In this way total security is achieved because a second line is not normally used to retrieve messages. The equipment is normally equipped with a 30-minute incoming recording tape. When the tape is exhausted the equipment will not accept any more incoming calls.

The system of the present invention is designed to be employed with standard DTMF (dual tone multi-frequency) telephone sets. If the customer has a rotary dial telephone set a pocket oscillator providing the necessary tone signals may be employed. One pushbutton of the oscillator will duplicate the frequency generated when the # pushbutton of the touch calling unit is depressed. The second button of the oscillator duplicates the frequency of the 3 button of the touch calling unit. A third button on the oscillator duplicates the frequency of the * button.

To access the recording equipment of the present invention, the customer merely removes the handset from the hookswitch and listens for dial tone after which he depresses the # button. To disconnect from the equipment, he places the handset back on the hookswitch which automatically places the answering and recording equipment in the standby condition. When the equipment has been accessed, dial tone disappears and a 1400 Hz tone is heard in the telephone handset. The equipment is now waiting for a command. The # pushbutton must be depressed within five seconds of lifting the handset or the equipment will not respond. If an incoming call occurs while the equipment is accessed ringback tone will be heard in the handset. To answer the call the customer simply goes on-hook and then returns off-hook to recieve the call, otherwise he may ignore the call and proceed.

To dictate an announcement the equipment is accessed as described above. When the 1400 Hz standby tone is heard, the customer will depress the * button for five seconds. He will then release the * button, pause momentarily and dictate the announcement into the handset. If the equipment is equipped with the standard announcement tape that announcement will then be restricted to a maximum of 25 seconds. After dictating the announcement the customer will depress and hold the # pushbutton for approximately five seconds.

When the announcement tape has completed one complete cycle it will automatically go into the check mode. This time the customer listens for five seconds of tone at the end of the message. If for any reason the announcement is unsatisfactory the mode of operation described above may be repeated.

If it is desirable for any reason to set the equipment for operation in the answer-only mode, the procedure followed by the customer will be like that described above except that after the message has been dictated, the depressing and holding the # pushbutton for five seconds thereafter is eliminated.

When the equipment is in the automatic answer mode and the customer receives an incoming telephone message, and either is not present to answer his telephone or chooses not to answer it, the equipment of the present invention will count the number of ringing cycles. If the count reaches the present number, the equipment will then answer the call. At this time the equipment will play the customer's previously recorded announcement. If the tone is present after the announcement has been made, the equipment will then transfer and begin to record the incoming caller's message. When the equipment starts to record, a timer starts which after it reaches a preset time causes a tone to be delivered to the telephone line after which the equipment is disconnected. As noted previously a message waiting tone is included which indicates to the customer that messages have been recorded. This tone is superimposed over the first five seconds of dial tone and is detected when the customer goes off-hook. In this manner he knows if during his absence incoming calls have been recorded. The circuit providing this feature is reset when the customer rewinds the tape to listen to the messages.

When the customer is ready to retrieve messages he accesses the equipment as described above. When the standby tone is heard he will depress the 3 pushbutton for approximately two seconds. The equipment indicates in minutes and seconds the amount of tape that has messages on it. For example, if the customer hears the pre-recorded message two minutes and twenty seconds, it indicates there are two minutes and twenty seconds of messages on the tape. At this time the customer may decide whether to listen to the messages now or at a more convenient time. If he chooses to listen at a later time he merely places the handset back on the hookswitch. If however he chooses to listen to the message at this time, he depresses and holds the number 3 pushbutton which will cause the tape to rewind. When the tape is fully rewound and the tone in the handset disappears the 3 pushbutton is released. At this point the messages recorded previously are now played back. If while reviewing the recorded messages, the subscriber desires to backspace or rewind the tape, he may do this at any time. This function is performed by depressing and holding the number 3 pushbutton for the length of time of the desired backspacing or rewinding period. When released the equipment then plays the recorded messages. The equipment of the present invention reverts to standby when the tape reaches the starting point of the initial rewind. If the customer desires to save the messages that are on the tape, he merely places the handset on the hook, if however he wishes to restore the unit for maximum recording time, he depresses and holds the number 3 pushbutton until the tone disappears after which he will depress and hold the # pushbutton until the tone is heard. The unit will thus be placed in the standby mode and at the beginning of the recording tape after which the customer may place the handset on the hookswitch.

As noted previously the equipment may optionally be equipped with a monitor speaker. When the present equipment after the preset number of rings answers the call; through the speaker the customer will hear the rings, the announcement message being delivered and the caller recording the message. To answer the call, the subscriber merely turns the monitor speaker volume all the way down and then goes off-hook with the handset. The present equipment disconnects from the telephone line and conversation may continue in the normal manner.

The equipment of the present invention is rack mounted electronic circuitry. As noted previously the line isolation apparatus must be located in the telephone central office. Alternatively the remainder of the equipment which constitutes its bulk, may be located in the telephone central office or in some other central location.

DESCRIPTION OF THE DRAWINGS

FIGS. 3 through 17 and 19 through 21 are schematic circuit diagrams of various portions of the present invention shown in block form in FIG. 1 and 2 referred to above.

FIG. 3 is a schematic diagram of a record/play amplifier circuit in accordance with the present invention.

FIG. 18 shows the manner in which FIGS. 1 and 2 are to be arranged.

In FIGS. 1 and 2 single digit numbers are shown within the blocks which indicate the terminal numbers shown in the associated detailed circuit drawing figures. In this way the connection of the detailed circuitry to the circuitry shown in the block diagram consisting of FIGS. 1 and 2 may be more easily followed.

DESCRIPTION OF THE PREFERRED EMBODIMENT

Figures 3, 4:
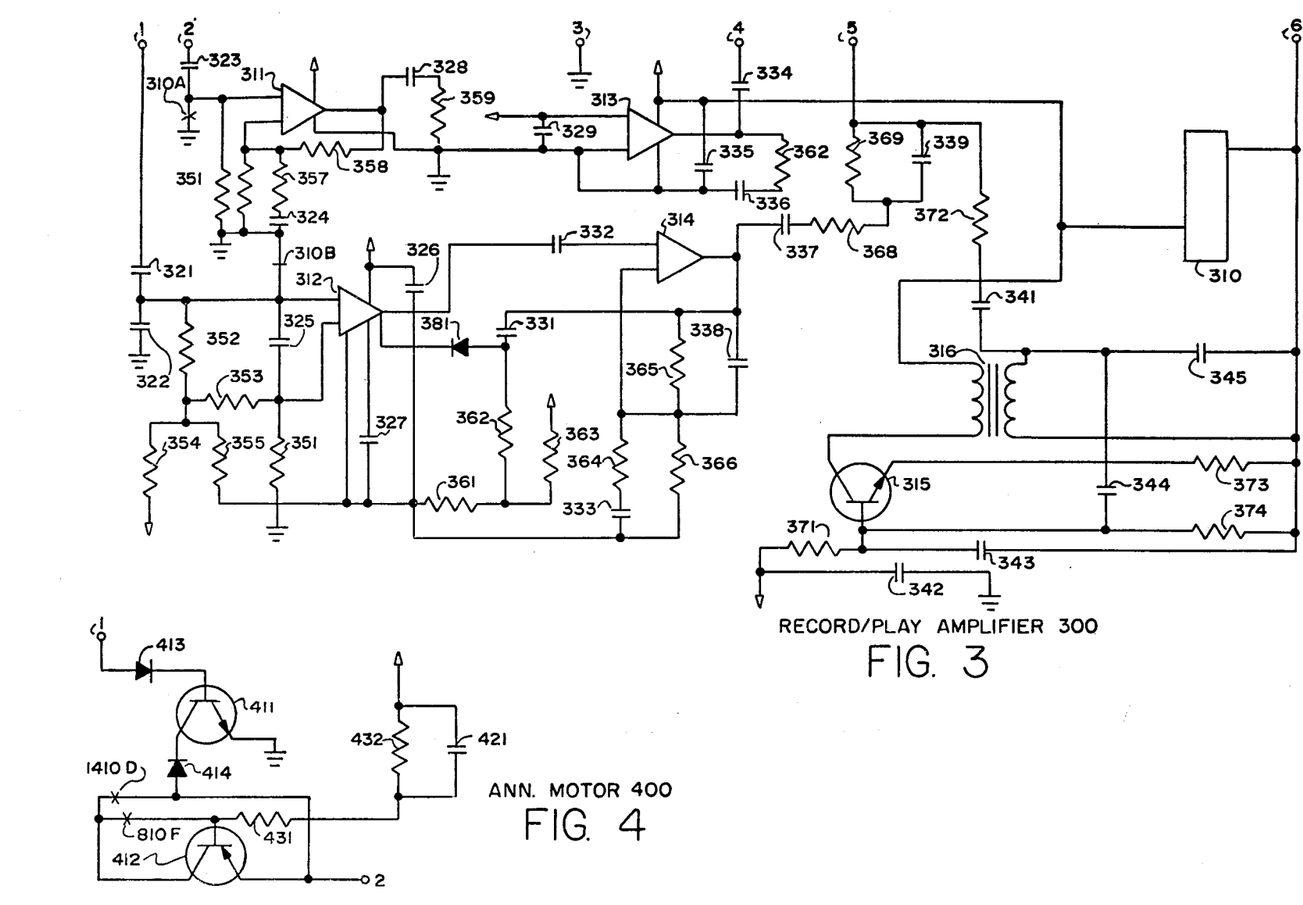

FIG. 4 is a schematic diagram of an announcement motor circuit in accordance with the present invention.

Figure 5:
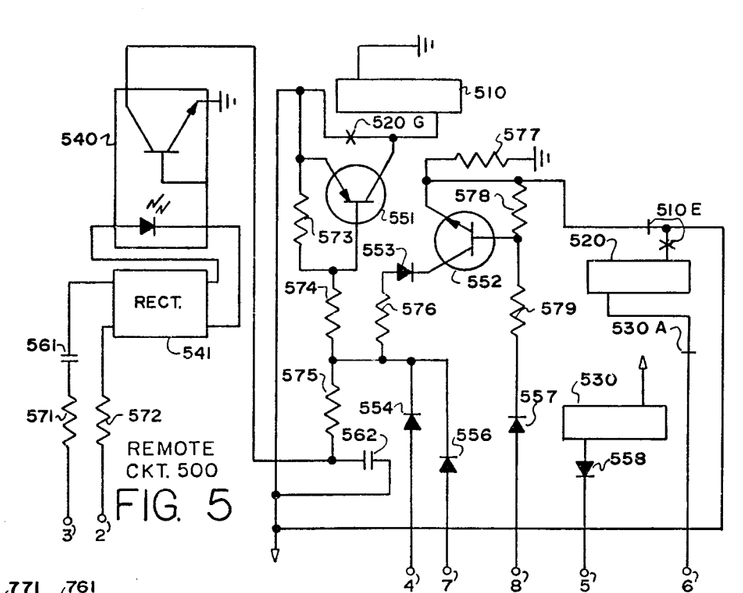

FIG. 5 is a schematic diagram of a remote circuit in accordance with the present invention.

Figure 6:
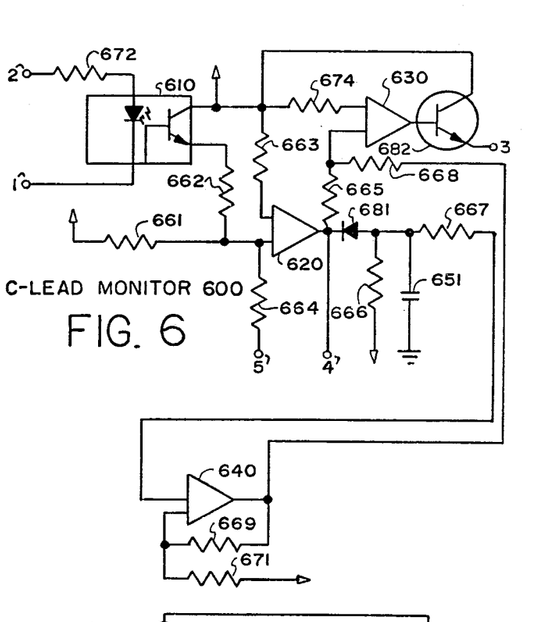

FIG. 6 is a schematic diagram of a C-lead monitor circuit in accordance with the present invention.

Figure 7:
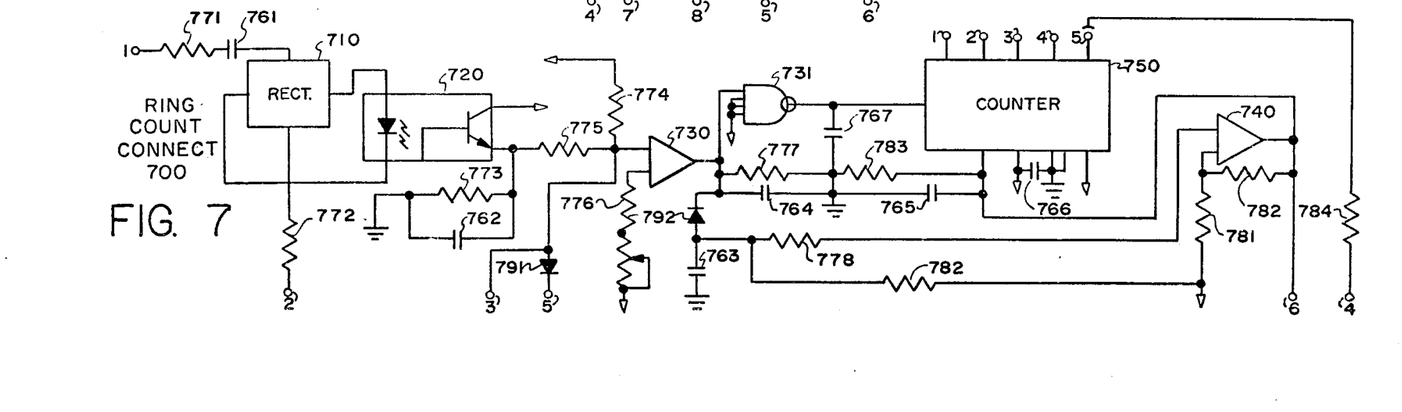

FIG. 7 is a schematic diagram of a ring count connect circuit in accordance with the present invention.

Figure 8:
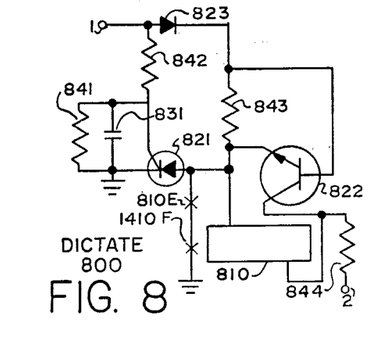

FIG. 8 is a schematic diagram of a dictate circuit in accordance with the present invention.

Figure 9:
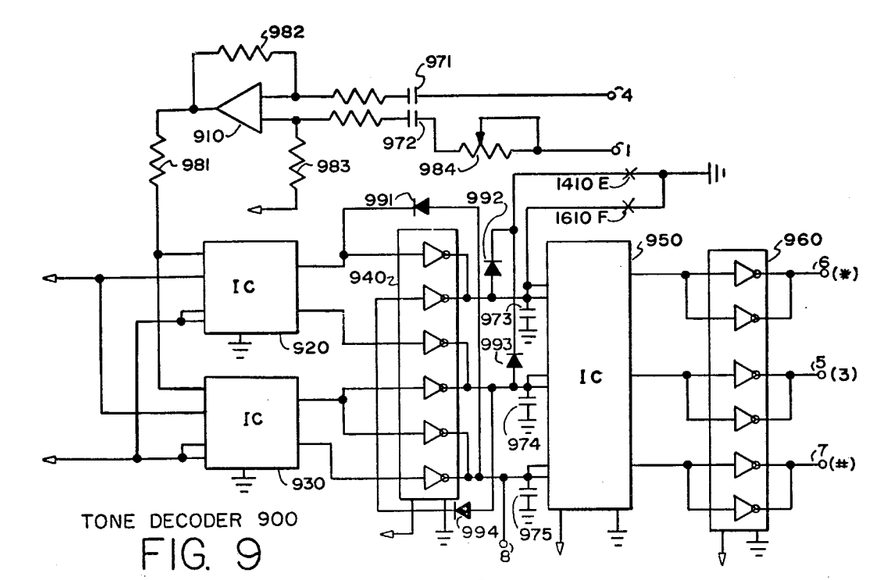

FIG. 9 is a schematic diagram of a tone decoder circuit in accordance with the present invention.

Figure 10:
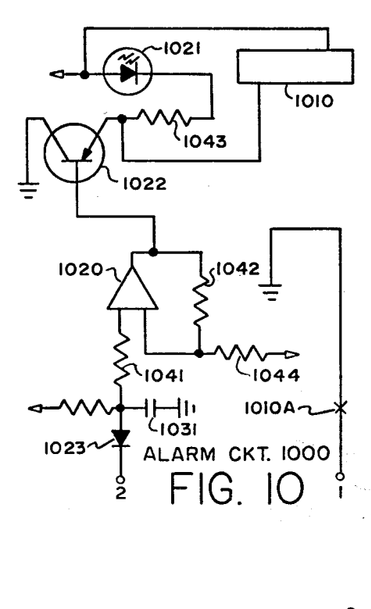

FIG. 10 is a schematic diagram of an alarm circuit in accordance with the present invention.

Figure 11:
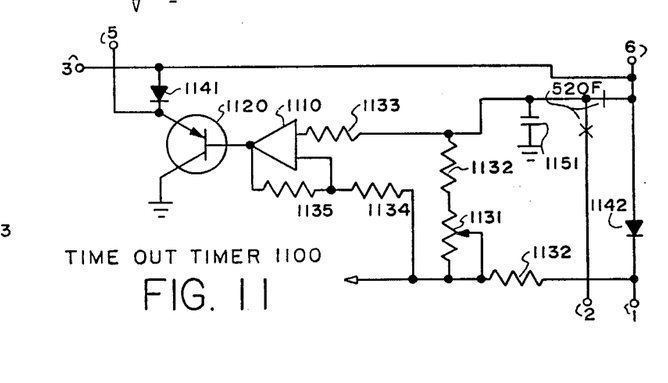

FIG. 11 is a schematic diagram of a timeout timer circuit in accordance with the present invention.

Figure 12:
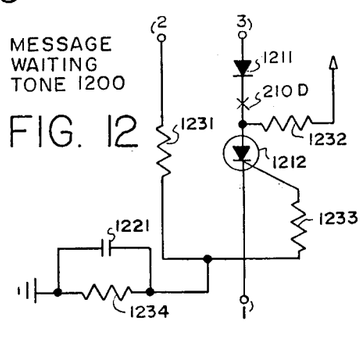

FIG. 12 is a schematic diagram of a message waiting tone circuit in accordance with the present invention.

Figures 13, 14:
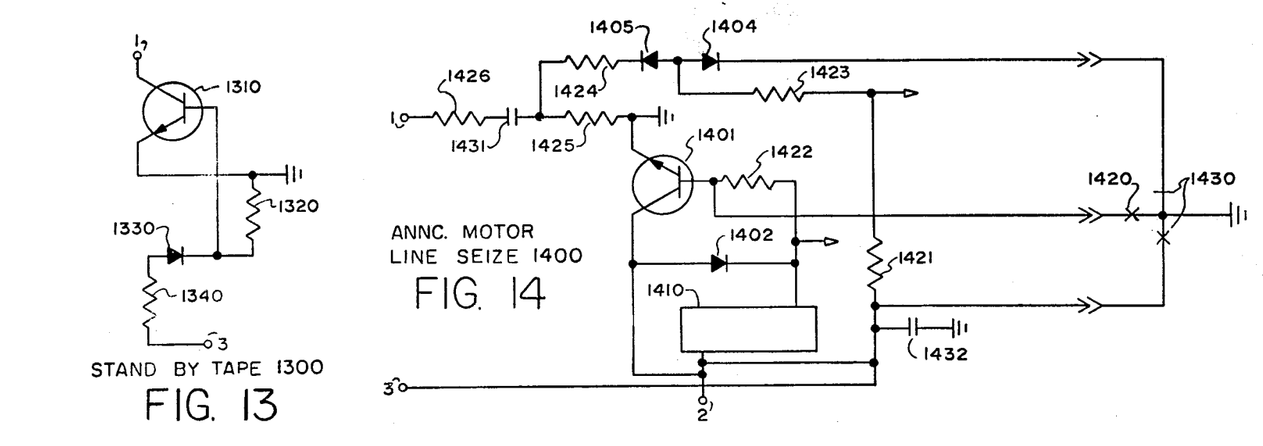

FIG. 13 is a schematic diagram of a standby tape circuit in accordance with the present invention.

FIG. 14 is a schematic diagram of an announcement motor line seize circuit in accordance with the present invention.

Figure 15:
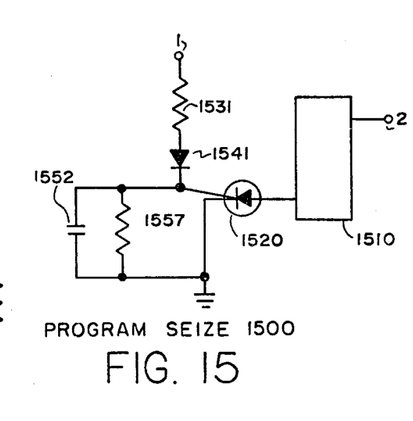

FIG. 15 is a schematic diagram of a program seize circuit in accordance with the present invention.

Figure 16:
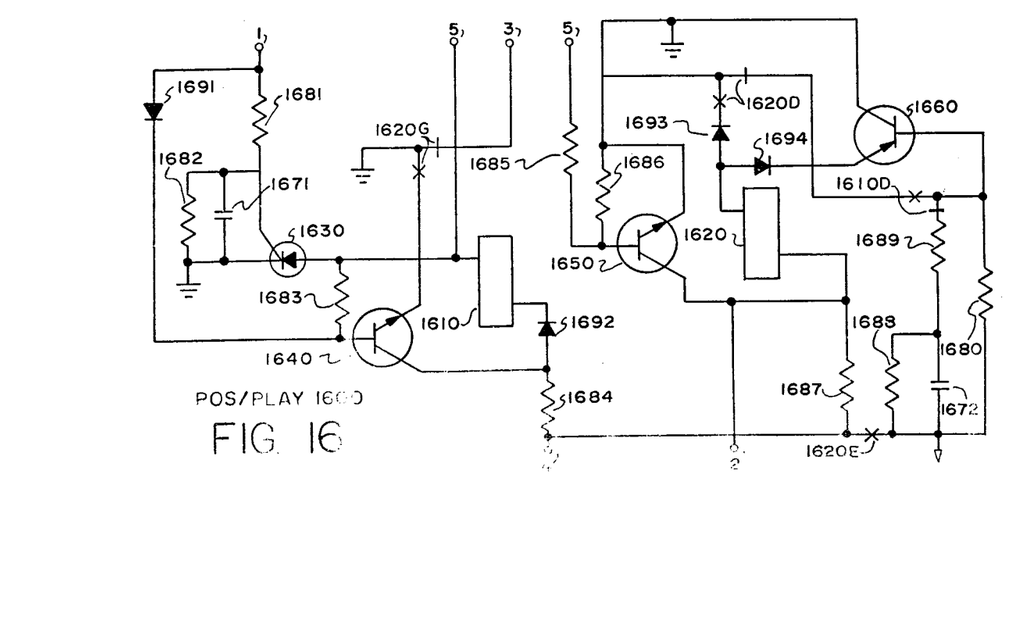

FIG. 16 is a schematic diagram of a position/play circuit in accordance with the present invention.

Figure 17:
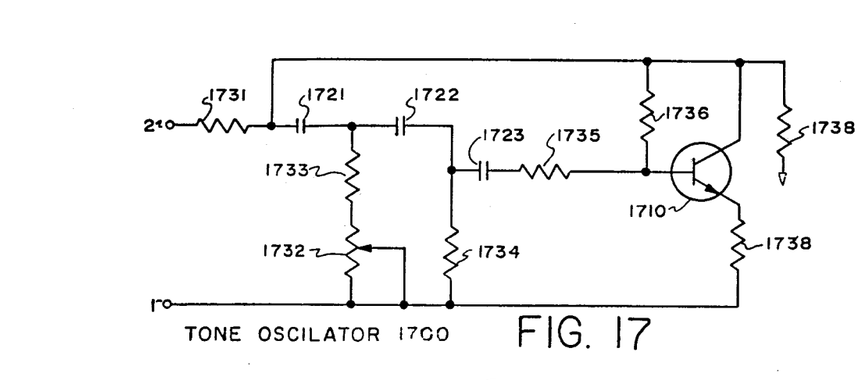
Figure 19:
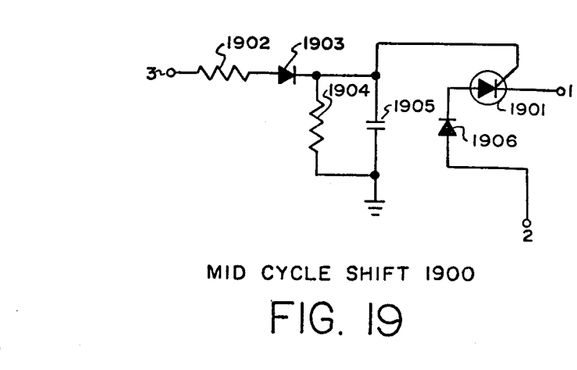

FIG. 17 is a schematic diagram of a tone oscillator circuit in accordance with the present invention.--; after line 9 insert the following:

FIG. 19 is a schematic diagram of a midcycle shift circuit in accordance with the present invention.

Figure 20:
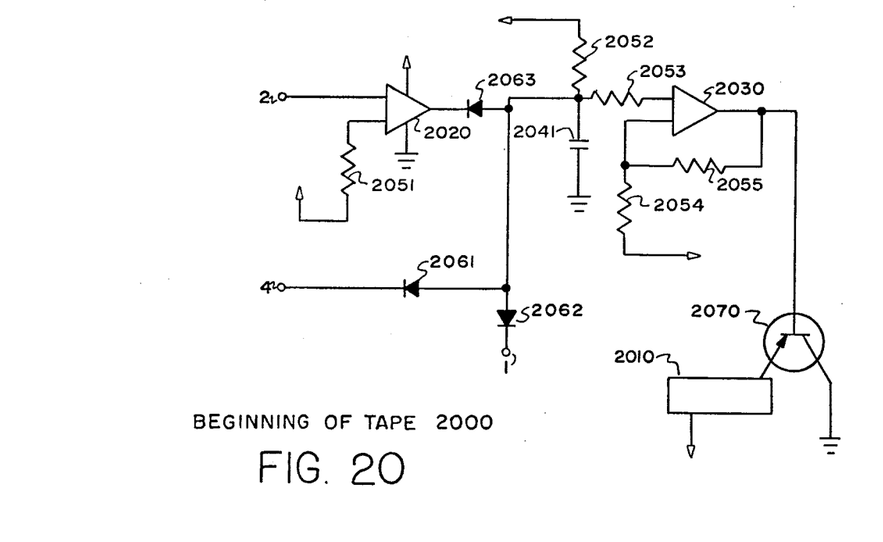

FIG. 20 is a schematic diagram of a beginning of tape circuit in accordance with the present invention.

Figure 21:
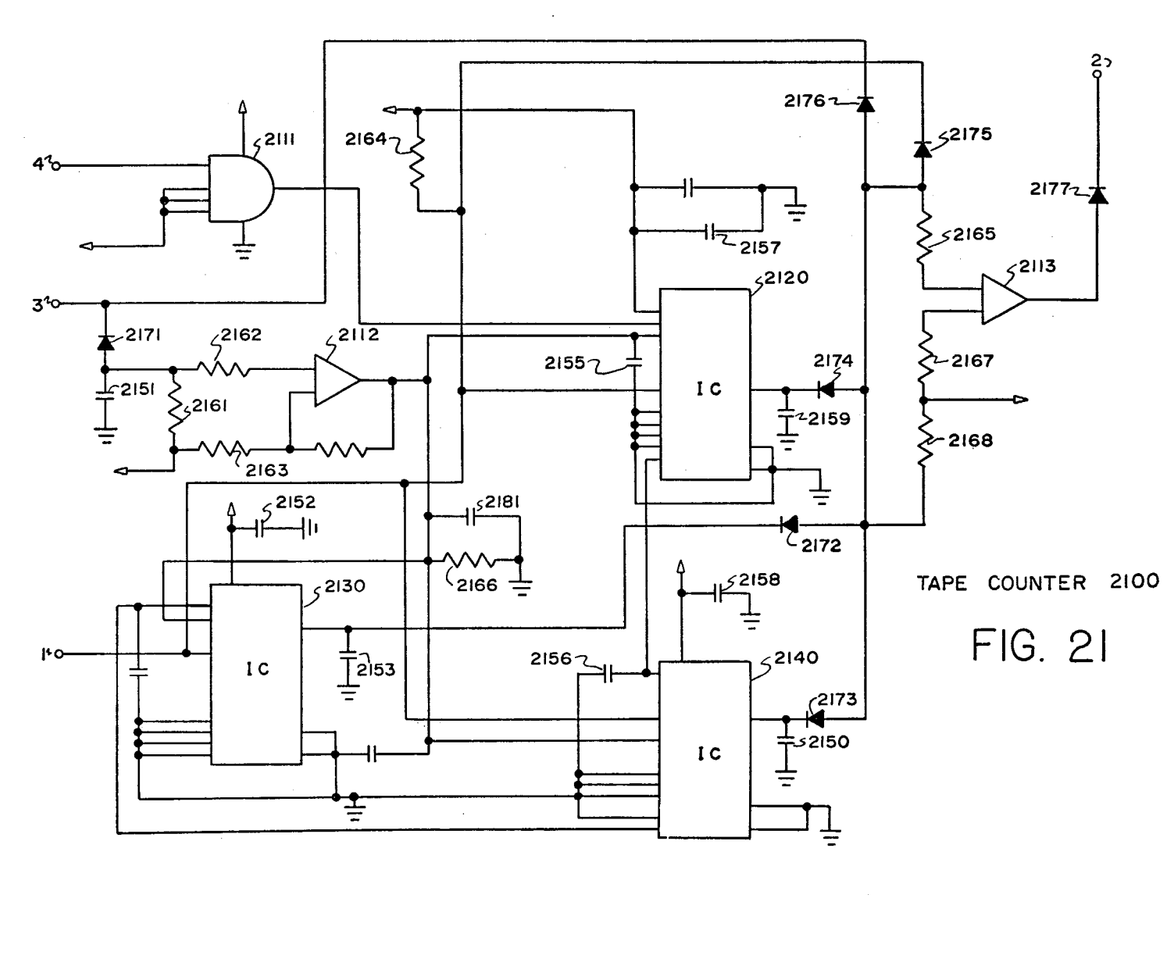

FIG. 21 is a schematic diagram of a tape counter circuit in accordance with the present invention.

In each of the figures of the above-described drawings the first digit of each three number indicia and the first two digits of each four number indicia indicates the drawing figure numbers where the component referenced by the indicia is located (transistor 412 appears in FIG. 4, transistor 1120 appears in FIG. 11, etc.) except in the case of certain relays wherein the coil is located in the figure indicated by the indicia while its associated contacts may occur on a detached contact basis (in a manner common to the telecommunication technology) throughout the other figures. Each relay contact combination carries the same indicia as its associated relay coil, plus the addition of an exclusive identifying letter, for example, relay 1410 whose coil is shown in FIG. 14 has associated contacts 1410A which appear in FIG. 1 and 1410B which appear in FIG. 2.

Figure 1:
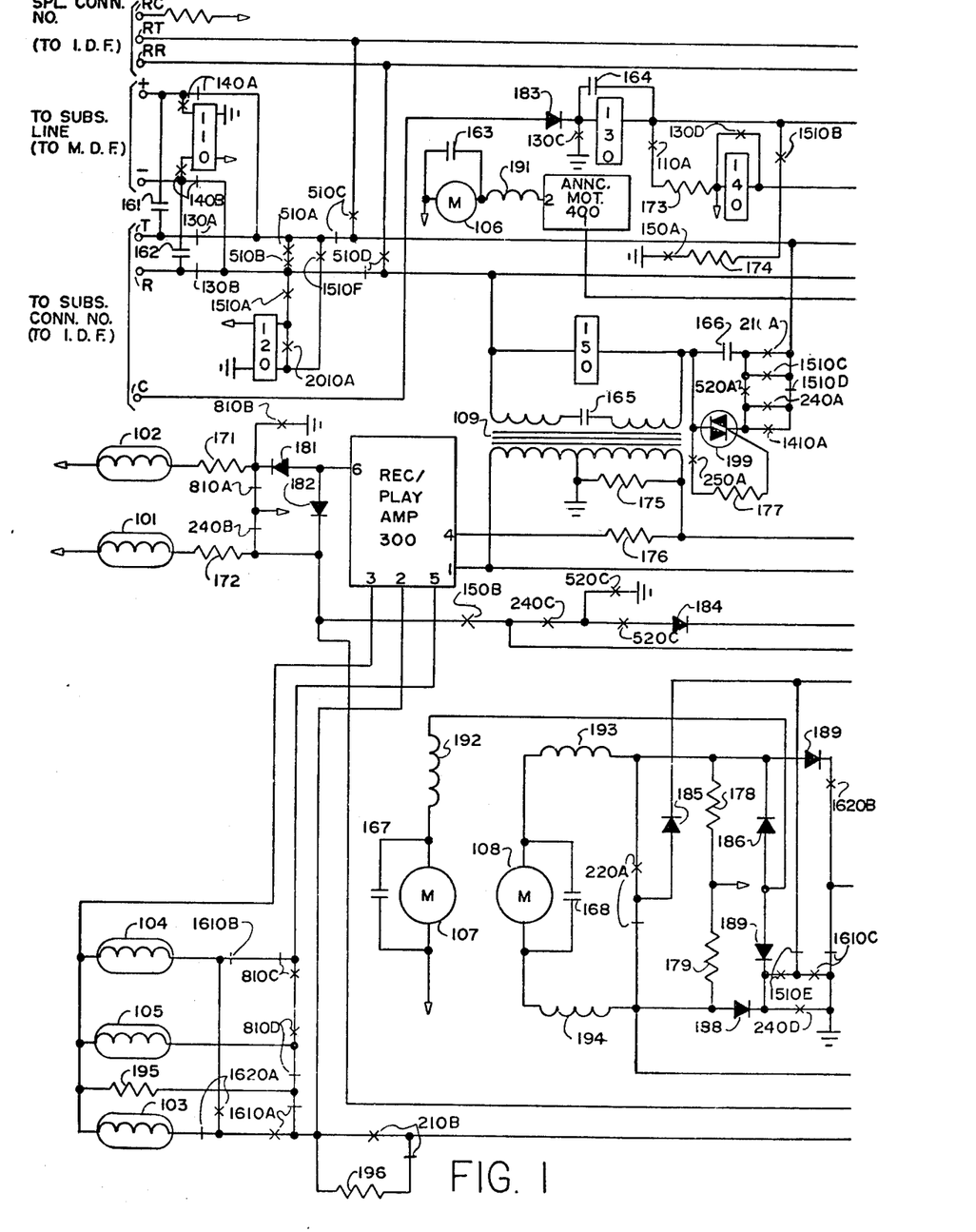
FIGS. 1 and 2 taken in combination constitute a composite block and schematic circuit diagram of telephone answering recording equipment in accordance with the present invention.
Figure 2:
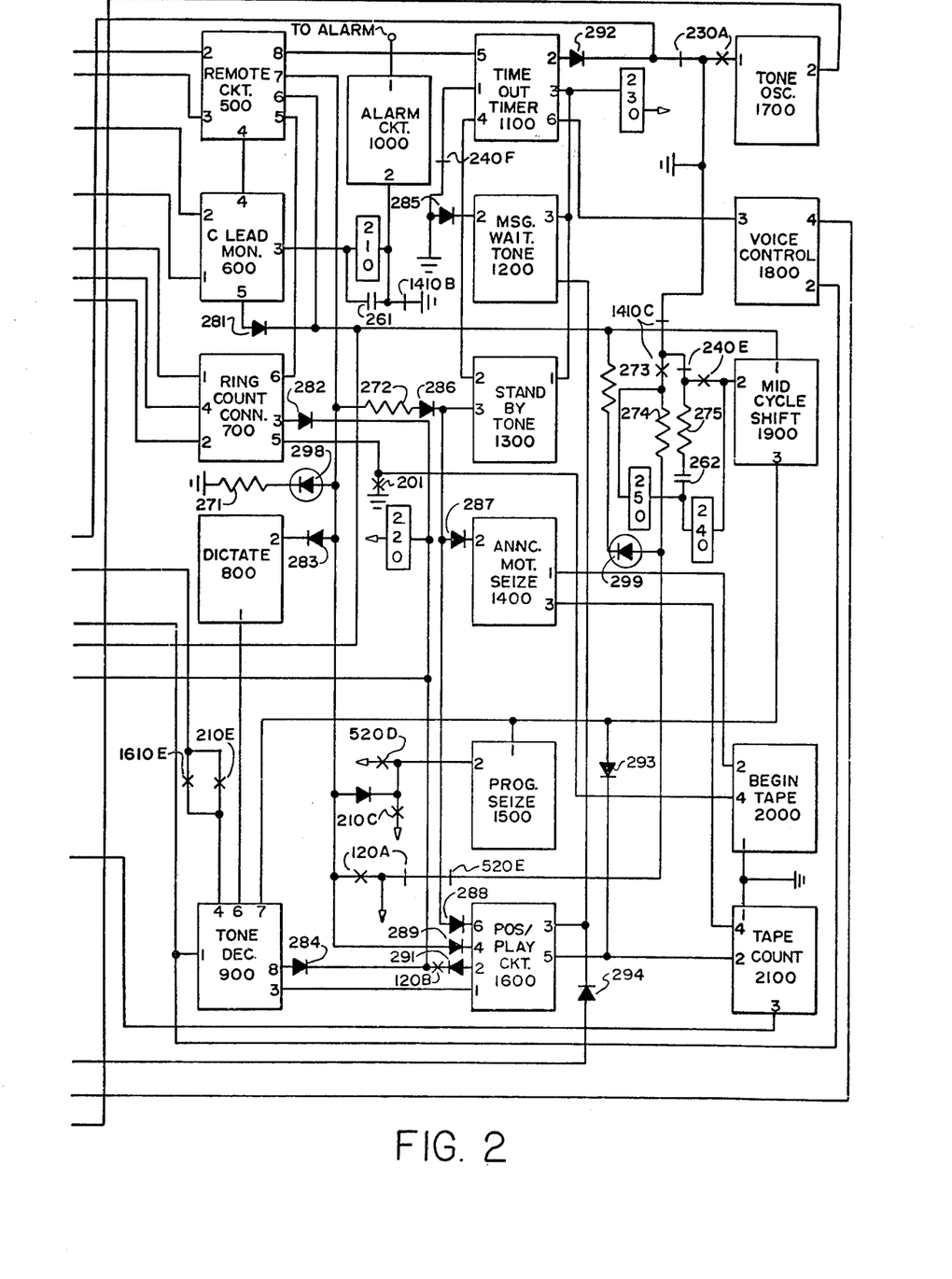

Referring now to the accompanying drawings, and particularly FIGS. 1 and 2 coming call to a subscriber served by the centralized answering and recording equipment of the present invention will be described. It should be noted as mentioned previously that the bulk of the equipment to be described, may be located in the telephone central office but alternately may be located in some other central location. However it is required that for each subscriber being served with equipment in accordance with the present invention, certain equipment for purposes of providing the necessary isolation of the telephone line during certain modes of operation must be located at the telephone central office. This equipment which is categorically referred to as the line isolation equipment consists of relays 110, 130, and 140. Also included are capacitors 161, 162, 164, and diode 183 see FIG. 1.

Incoming ringing signals from the telephone central office serving the subscriber, are conducted from the subscriber's connector, at the IDF, over terminals T and R to terminals + and − appearing on the MDF where they are connected directly to the subscriber's telephone at his residence or place of business. This same ringing signal also appears at the automatic answering and recording equipment located also in the telephone central office or other convenient nearby location. Appearing on terminals T and R of the answering and recording equipment the incoming ringing signal is applied to the ring count connector 700 (FIG. 7) and therein to the input of a bridge rectifier GR710. The output signal from the rectifier is applied to the input of an optical isolator 720 whose output is utilized to drive a filter section consisting of resistor 773 and capacitor 762. The output is also applied to a differential amplifier 730. This amplifier acts as a comparator comparing the output signal from the optical-isolator to a reference potential. If the output from the optical-isolator exceeds that of the reference an output will be derived from amplifier 730. It should also be noted that the filter section connected to the output of the optical-isolator provides protection against dial transients. The output of the amplifier 730 feeds a Schmidt trigger circuit 731 which acts to shape the outgoing pulse for application to the input of a shift register counter 750. The output of the amplifier 730 is also applied to reset timer 740, which has a timing period of 10 seconds. The output of this timer is applied to the enable input of the shift register counter. In response to each incoming ringing burst the timer is reset so the memory is not cleared. If the call is abandoned after 10 seconds the timer will clear the shift register. Assuming the call is not abandoned incoming pulses from the Schmidt trigger are applied to the clock input of the shift register and counting begins.

The shift register 750 has a number of outputs each of which go true in response to a particular count. Depending upon the desired number of rings before the recording and answering equipment operates, the appropriate output will be strapped to other circuitry. In the embodiment shown the output of the shift register that is strapped, is that associated with the receipt of a fifth incoming ring. After five rings are received an output appears and is transmitted to the announcement motor drive circuit 400 (FIG. 4) and particularly to transistor 411. Operation of transistor 411 is effective to start the announcement motor 106. The tape used for announcements in the present equipment incorporates at its beginning a foil section which conducts ground through switch 1420 (FIG. 14). As the tape advances and ground is removed from switch 1420 transistor 1401 operates relay 1410. It should be noted at this time that while a metalized portion of the tape is used and an electrical contact performs removal of ground, to effect actuation of the transistor, it may also be possible to use an optical or light reflecting arrangement or some form of pressure sensitive microswitch at this point, it only being required that as the tape advances a signal is forwarded which will alternately operate and restore relay 1410.

In response to the operation of relay 1410 through its contacts 1410A the telephone line is now connected to Triac 199. Relay 1410 also connects a capacitive ground at its contacts 1410C to relay 250 operating it. In response to operation of relay 250, Triac 199 becomes conductive connecting the telephone line directly to the calling party control relay 150. In this manner the telephone line is bridged and ringing from the telephone central office is stopped by virtue of the completion of the loop formed by relay 150. After a short period of time capacitor 262 discharges causing relay 250 to be restored.

Operation of relay 150 connects ground through resistor 174 to relay 140 causing relay 140 to operate at this time. Relay 140 in operating isolates the subscriber's telephone line as far as DC signals are concerned from the telephone line. Relay 140 at its associated contacts 140A and 140B connects relay 110 directly to the subscriber's line to monitor the subscriber's telephone line for off-hook conditions at the subscriber's telephone instrument.

The incoming call as noted previously after five rings has now been connected to the centralized answering and recording equipment. The equipment is now prepared to playback to the accessing telephone subscriber the announcement message. Audio signals from the announcement tape are picked up by head 105 coupled through relay contacts 810D and 810C, to the input of the record/playback amplifier 325 wherein signals are amplified and then applied through a 15 ohm resistor 176 to the line transformer 109. The return path for this signal is to ground. This signal is then coupled to the opposite windings of transformer 109 which are connected across the coil of relay 150 and also across the telephone line. In this manner the message on the announcement tape, advising the subscriber that he has accessed an answering device is coupled over the telephone line to the accessing telephone subscriber.

After the announcement has been completed a tone at the end of the message recorded on he same tape is played to initiate what is referred to hereinafter as midcycle shift. This tone picked up by the transformer 109 is coupled to the input of the differential tone amplifier 910 included in tone decoder 900 (FIG. 9).

The tone decoder circuitry shown in FIG. 9 will now be described in detail. Incoming signals are coupled to dual tone detector integrated circuits (IC) 920 and 930. In response to receipt of any of four frequencies, 1209 Hz, 697 Hz, 1477 Hz, and 941 Hz, a digital "low" signal appears on the output terminal of either of the integrated circuits depending upon which signal has been received. In the case of 1209 Hz it appears on the output of IC920, in the case of 697 Hz it appears on the output of the same IC while 1477 Hz appears on the output of IC930, and 941 HZ also appears on the output of that same IC. These outputs are then coupled through logic gate circuitry 940 to timer stages that are a portion of IC950. The timer puts out an output signal in response to a combination of 1209 Hz and 941 Hz, in response to the combination of tones of 1477 Hz and 697 Hz, and in response to receipt of the combination of 941 Hz and 1477 Hz signals. Hereinafter the first combination of 1209 Hz, and 941 Hz will be referred to as the * frequency, the combination of 1477 Hz and 697 Hz will be referred to as 3, and the 941 Hz and 1477 Hz, will be referred to as #. These outputs are then applied (through inverter stage 960) from the tone decoder circuitry to the remaining circuitry of the centralized answering and recording equipment, as required.

Returning again to the discussion of midcycle shift: signal tone is received initially at the tone decoder 900 previously described and because it actually consists of a combination of 941 Hz and 1477 Hz tones an output appears on the # output of tone decoder. This output signal is then applied to the gate of SCR1901 (FIG. 19) causing it to conduct. In response to conduction of SCR1901 relay 240 operates. It should be noted that the operating path for SCR1901 was through contacts of relay 150 and also contacts of relay 230. Operation of relay 240 establishes a short circuit around contacts 1410A of relay 1410, to hold the line for the incoming message cycle. Operation of relay 240 is also effective to operate integrated circuit 1110 to start timing. IC1110 is a part of the time-out timer 1100 (FIG. 11) and is adjustable over a range of 30 to 60 seconds by resistor 1101. Relay 240 also applies ground through resistor 172 to the incoming erase head 101 and ground through diode 182 to the switch input of the record play amplifier 300 (FIG. 3) causing the amplifier to switch from the playback mode to the record mode.

Incoming signals received over the telephone line at transformer 109 are now coupled from the transformer to the record input of the record/playback amplifier 300. Signals amplified therein are taken from the record output and applied through contacts 810C and contacts 1610B to the incoming record head 104 wherein they are coupled to magnetic recording tape, used as the recording medium in the present equipment.

While it has been shown in the present equipment to use recording tape and conventional pick up and record heads in the conventional tape recording/playback arrangement, it should also be understood that other forms of memory might also be utilized and incoming information might be applied thereto in digital form and likewise recovered in the same manner.

The incoming message is now recorded. Termination of the incoming message or the announcement message may be made at any time during the previously mentioned description in the following manner: First the 30 second timer IC1110 operates after its time period of 30 seconds to operae relay 230. In response to operation of relay 230 SCR1901 of midcycle shift circuit 1900 (FIG. 19), is rendered nonconductive, releasing relay 240. Relay 240 restores after a short period of time (approximately 3 seconds) because of the discharge time of capacitor 262. All other previously operated relays also release restoring the unit to its normal or unoperated condition.

A second manner of disconnecting the answering equipment occurs when the calling party hangs up. At this time in a telephone central office having calling party relese, the loop voltage goes momentarily to zero and SCR199 becomes nonconductive causing relay 150 to release which in turn causes relay 240 to release in a manner similar to that previously outlined which in turn will cause the other relays to also restore. The third manner in which the equipment may be disconnected occurs when the subscriber having answering service provided by the machine of the present invention answers a call while the machine has already seized the telephone line. At that time when the subscriber goes off-hook he completes a loop over terminals − and + at the MDF input to relay 110. At this time relay 110 operates because of the completed loop. The associated terminals of relay 110 connects at terminal 110A, battery to relay 130 causing it to operate through diode 183 which connects to ground on the C lead extending from the telephone central office at terminal C to the IDF. Operation of relay 130 is effective at its associated contacts to open the telephone line from the telephone answering machine causing the conditions to be interpreted the same as when the calling party disconnects as outlined previously.

MESSAGE RECOVERY OR PLAYBACK BY THE TELEPHONE SUBSCRIBER

When the subscriber having answering service provided by the present equipment, goes off-hook he receives dial tone via the leads from the IDF terminals T and R at the telephone central office and extending out from the + and − terminals at the MDF. The telephone central office also connects ground to the C lead of the IDF at this time. Although ground through diode 183 is present relay 130 is not operated. This ground is also connected at terminal 2 to the C lead monitor circuitry 600 (FIG. 6) and particularly to resistor 672 and to the input of an optical isolator 610. The return path from the optical isolator is to the coil of relay 140 which is not operated at this time. Neither relay 130 or 140 operate, since insufficient current flow is available to cause them to operate because of the presence of resistor 672 which has a resistance of 100,000 ohms. Current flowing through the optical isolator causes an output which is extended to one of the inputs of comparator amplifier 620. If the voltage appearing on the input is of sufficient magnitude compared to the reference voltage connected to the other input of amplifier 620, an output appears from comparator amplifier 620 and is applied to one of the inputs of an associated amplifier 630 serving as an AND gate whose output is connected to transistor 682. The output from the comparator amplifier is also connected to a timer section 640 of the "C LEAD" monitor 600 whose output provides the other input of the AND gate.

The output from the timer is combined with the direct output from the comparator amplifier in the AND gate circuitry to cause operation of transistor 682. After a predetermined period of time the timer times out and through the previously outlined circuitry transistor 682 is turned off. The duration of operation of the transistor is approximately 5 seconds. During the operation of transistor 682 relay 210 is operated which through its contacts 210A capacitively couples transformer 109 to the telephone line.

If previously recorded messages which have not been retrieved are present on the recorded message tape of the answering unit, SCR1212 of message waiting circuit 1200, (FIG. 12) will be in the conductive mode this occurs because it was gated on during the incoming recording of previous messages. It is gated on by relay 240 and will remain on until he operation of relay 1620 which will be described hereinafter. SCR1212 will conduct ground through relay contacts 210D and diode 1211 to relay 230 causing relay 230 to operate at this time. Operation of relay 230 causes the tone oscillator 1700 (FIG. 17) which inclues transistor 1710 and associated components to turn on at this time. This oscillator produces a tone (approximately 1400 Hz) which appears on the collector of transistor 1710 and then is coupled through resistor 1713, relay contacts 210B to the play input of the record/playback amplifier 300. Amplified signals at the playback output are then coupled to the telephone line through transformer 109 in the manner previously described. At the subscriber's instrument a message waiting tone (1400 Hz) is heard to indicate the presence of messages on the tape, (at the centralized answering and recording equipment).

After five seconds this tone will disappear in the manner previously described. During this same period of time signals from the telephone line are also coupled to the tone decoder 900 (FIG. 9) in a manner previously described in connection with midcycle shift. The # tone is detected, and SCR1520 will be caused to conduct and to operate relay 1510, over a path that extends through relay contacts 210C. Operation of program seize circuit 1500 (FIG. 15), commences when relay 1510 at its contacts 1510B places a short across the leads to relays 130 and 140 which will cause relay 130 to operate. Operation of relay 130 will inhibit relay 140 from operating at this time, also at associated break contacts 130A and 130B isolation of the central office at the line IDF from the subscriber or the answering machine will also take place. The telephone line is now capacitively coupled at the IDF by capacitor 161 and 162 for monitoring of incoming ringing signals.

DC power is now fed to the subscriber through relay 120 and relay contacts 1510A and 1510F to the telephone line. The loop resistance of the subscriber's telephone line will now hold relay 120 operated, which in turn will hold relay 1510 operated at contacts 120A. At this point relay 210 will release as the C lead monitor circuit 600 is no longer conductive.

The unit has now been seized and the subscriber will hear a standby tone. This tone originates with battery through contacts 120A, through resistor 272 and diode 286 to stand by tape circuit 1300 (FIG.13), through resistor 1330 and diode 1330 to transistor 1310 will cause transistor 1310 to conduct at this time. Conduction of transistor 1310 will cause operation of relay 230.

When relay 230 operates the tone oscillator 1700 (FIG. 17) which includes transistor 1710 turns on and tone at the collector through resistor 1731 through relay contacts 210B through resistor 196 is applied to the input of the playback amplifier 300. The output from the playback amplifier is connected to the telephone line in the manner previously described.

On hearing standby tone, the subscriber (assuming that the subscriber has a touch calling telephone) will push the digit "3" pushbutton to generate the appropriate signals associated with this number which will be conducted over the intervening telephone line and through contacts 1510C and capacitor 161 to a winding on transformer 109. Return is from the transformer back to the telephone line. The tone signals will be coupled from the opposite winding of the transformer 109 to the input of the tone decoder 900 (FIG. 9). Input comes in on terminal 1 of the tone decoder 900 and the output appears on terminal 5. The output on terminal 5 is then applied to position/play circuit 1600 (FIG. 16) at the gate of SCR1630 to render it conductive. The output from the tone decoder is also applied to the base of transistor 1640 to render it conductive to place a short across relay 1610 to inhibit its operation at this time. After release of the tone, transistor 1640 becomes nonconductive and relay 1610 operates through the previously established operating path set up through SCR1630 and through diode 1692, resistor 1684 and through contacts 120A to battery. Operation of relay 810 of dictate circuit 800 (FIG. 8) establishes a path through relay contacts 1510E to initiate operation of the incoming motor designated 102. Ground from SCR1630 causes standby tape circuit 1300 (FIG. 13) transistor 1310 to become nonconductive thus releasing relay 230 and the tone oscillator 1700 at this time.

The tape on which incoming recorded messages have been recorded, also includes a separate track on which indicia indicate the amount of tape in time that has been used. These markings may be in minutes, seconds, or any other appropriate form. Signals as to the amount of tape that has been used are thus in this manner picked up and coupled through the head 103 and through the playback amplifier 300 through contacts of relay 1610 and relay 1620. After amplification by the playback amplifier they are connected to the telephone line through the transformer 109 in the manner previously described. These signals are then heard by the subscriber and indicate the approximate amount of time which has been devoted to recording on the remotely located recording equipment at the telephone central office.

The subscriber may hang up now which will cause the machine to disconnect in the manner to be described hereinafter. Or alternately he may retrieve the messages that have been recorded at this time.

Assuming now that the subscriber desires to retrieve the previously recorded messages he'll operate the 3 pushbutton on his touch calling telephone, transmitting the associated combination of two tones to the answering and recording equipment wherein they will be detected in the manner previously described. This detection results in an output from the number 5 terminal of the tone decoder which will cause position/play circuit 1600 (FIG. 16) transistor 1640 to conduct placing a shunt around associated relay 1610, causing relay 1610 to restore. Prior to its restoration relay 1610 kept capacitor 1672 charged. Upon its release capacitor 1672 discharges through a path via resistor 1689 to the base of transistor 1660 which in turn will cause relay 1620 to operate. Relay 1620 operates and locks over its associated contacts 1620D and diode 1693 and resistor 1687 back to ground. The operation of relay 1620 switches the input of the playback amplifier from the position head 103 to the incoming pick up head 104. At this time relay 1610 is restored and relay 1620 is operated. This operation will cause the tape to rewind by placing ground through relay contacts 1610C and relay contacts 1620B to the head position motor 108, causing it to remove the head structure from contact with the associated tape and engage the rewind idler mechanism. As long as the tone is maintained by the subscriber the tap will be rewound. While the tape is moving a switch 1430 known as the tape motion switch in the announce motor seize circuit 1400 (FIG. 4) is held in alternate operated and restored positions. Pulses from this switch are applied to the input of Schmidt trigger circuit IC2111 in tape counter 2100 (FIG. 21). The output of the Schmidt trigger provides an input to integrated circuit IC2120 which is a so called "up-down" counter. This unit may utilize any of the many conventional forms prevalent in the prior art.

Prior to the operation of relay 1620 the counter 2120 was held in the reset mode by application of ground through contacts 1620C. When relay 1620 removes ground at those contacts, the counter becomes enabled by removal of the ground. The same ground was also available to hold comparator IC2020 of the begin tape circuit 2000, (FIG. 20) in the reset condition. That ground which caused the head position motor 108 to retract the head from contact with the tape in the rewind mode, is also available from contacts 1610C to reset the timer section of IC2112 through diode 2171. The output of the timer section from 2112 is applied to the up-down control of the counter 2120. When the timer is in the reset condition the counter counts down while in the time-out condition it counts up. Since the unit is in the rewind mode, counting is down from zero position.

At the same time switch 1430 of announcement motor line seize circuit 1400 (FIG. 14) is pulsing the Schmidt trigger IC2111, it is also applying ground pulses through a pulse shaping network consisting of diode 1404, resistor 1423, diode 1405, resistors 1424 and 1425, capacitor 1431, and resistor 1426. Its output is applied to the beginning of tape circuit 2000 (FIG. 20) comparator section of IC2020. The output of the comparator section of the IC2020 controls a timer section IC2030 through diode 2063. As long as pulses from the switch 1430 are present pulses are applied to the input of the comparator circuit which will maintain the associated timer in the reset condition. Upon the pulses from the switch stopping, the timer portion of IC2020 will time-out causing relay 2010 to operate. Relay contacts 2010A will place a short circuit across the T and R leads of the telephone line removing battery from he subscriber's telephone and causing the tone to stop, for both the machine and the customer. Because tone is no longer present the tone decoder will release the hold which is present in the form of a signal at the base of transistor 1640 to cause relay 1610 to reoperate. With both relays 1610 and 1620 operated a ground will be present of motor 108 to drive the head assembly back to engage the tape at this time. This action places the machine in the playback mode. Because the unit is in the playback mode IC2120 is in a count up mode.

Messages recorded on the tape are thus picked up by pick up head 104, amplified by the playback amplifier 300 and applied over line transformer 109 to the telephone line where they are conveyed over the telephone line to the subscriber's instrument where they are monitored. When the machine goes into the playback mode pulses from the tape applied through switch 1430 are again available. They reset the timer 2030 that is a portion of beginning of tape circuit 2000 to cause relay 2010 to release and open the short circuit applied across the telephone line.

At any point during the monitor or playback mode the subscriber may operate the number 3 button of the touch calling telephone which will cause the associated machine to go into the rewind mode.

If the subscriber desires to stop monitoring several courses of action are available. First he may simply hang up to cause the unit to go into the fast forward mode which will be described hereinafter. Alternately the unit may be allowed to go until the counter returns the unit to standby at which time standby tone through relay 230 will be applied to the telephone line to indicate that the playback mode is completed. Another alternative permits the subscriber to push the # button on his associated touch calling telephone unit which will cause the unit to go in the standby mode instantly. For better understanding of the above mentioned modes of termination of the playback operation, they will be described in more detail hereinafter.

First assuming the subscriber wishes to terminate playback by operating the # button at his touch calling telephone. Tone is decoded in the manner previously outlined by the tone decoder circuitry and appears in the number 3 terminal of the tone decoder as an output signal. This signal is then applied through diode 293 to the position/play circuit 1600 (FIG. 16) and resistor 1685, to the base of transistor 1650, causing transistor to conduct, placing a shunt across relay 1620 causing it to restore. This in turn causes relay 1610 to restore placing the unit in the standby mode. If the subscriber allows the playback operation to go on to its ultimate end. Tone is returned indicating the unit is in the standby mode, the counter will cause the unit to return to standby. This occurs when the counter gets to the zero position at which time the comparator circuit 2113 recognizes an output from the counter and applies an output signal through diode 2177 through resistor 1685 to the base of transistor 1650. When this happens transistor 1650 is operated placing a shunt across relay 1620 causing it to restore which in turn will cause relay 1610 to restore in the manner described above. When the subscriber elects to merely hang up at the subscriber station, the DC loop to relay 120 is broken and relay 120 will restore. This in turn causes relay 1510 of program seize circuit 1500 (FIG. 15), to restore. When relay 1510 restores relay 130 will restore and if the unit is in the standby condition all other relays will restore at this time. If the unit is in the playback mode at this time relay 1620 will hold relay 1610 and itself operated over a path through its own contaacts 1620E to battery. This places the unit into the fast forward mode by applying a ground through relay contacts 1610C and relay contacts 1510E to the fast forward circuitry. This applies ground to the head position motor 108, causing the heads to be retracted or removed from contact with the tape. This also causes relay 220 to operate. Combination of operation of the relay 220 and movement of motor 108 is effective to place the associated linkage mechanism in the fast foward mode. It should be noted that contacts on relay 220 insure that the heads are in contact with the tape, before the mechanism switched to the fast forward mode. This arrangement eliminates mechanical difficulties. Once the unit has been drawn into the fast forward mode relays 1610 and 1620 will restore from the counter circuit as previously described. Ground from the fast forward circuitry also prohibits the unit from decoding any incoming tones received over the telephone line until the unit has reset.

When an end of tape condition exists which will result in switch 1430 no longer producing output pulses relay 2010 will operate in a manner previously outlined, to cause relay 120 to also operate this will cause all operated relays to restore. Once the equipment has reached the end of tape condition described previously the equipment will no longer answer any incoming messages until such time as the subscriber has accessed the equipment and reset it.

As noted previously when the answering equipment of the present system has been accessed by a party attempting to contact the subscriber associated with the equipment, and has been unable to do so he may leave a recording. As a preliminary to making that recording he receives from the centralized automatic answering and recording equipment a message. This answering message may be prerecorded, or alternately, be recorded by the subscriber having answering and recording service in the following manner:

The subscriber will seize the unit by operating his touch calling telephone # key to place the unit in the standby mode in the manner previously outlined. As soon as the unit has gone into the standby mode the subscriber will push the * button on the touch calling telephone to cause an output at terminal 6 of the tone decoder 900 (FIG. 9). This output signal will be applied through resistor 842 to turn on SCR821. This signal also goes through diode 823 to turn on transistor 822. Transistor 822 provides a shunt path for relay 810. When tone is removed by the customer, relay 810 which has been conditioned will now operate over the holding path through SCR821 which was turned on previously. The remaining operating path is through resistor 844 back through the relay contacts 120A.

When relay 810 operates ground is applied through contacts 810B of relay 810 to the record switch input of the record/playback amplifier causing it to go into the record mode. Ground is also applied through resistor 171 to the announcement erase head 102. High frequency bias signals, and audio signals, through relay contacts 810C and 810D are applied to the record head, by the record oscillator mechanism to provide for recording of a new message. Old messages are erased by a DC voltage which is applied to the erase head. Operation of relay 810 also applys a signal to the base of transistor 411 of announcement line sieze circuit 1400 (FIG. 14) (FIG. 4) causing it to operate which will cause the announcement motor 106 to operate. A ground from relay 810 through contacts 810F, and resistor 431 will charge capacitor 421. As noted previously when the contacting foil moves forward with the tape, switch 1420 operates causing transistor 1401 to operate which will cause relay 1410 to operate. When relay 1410 operates SCR821 will be rendered nonconductive. however relay 810 will remain operated through contacts 810E applied to transformer 109 and back over the telephone line to the on relay 810 and contacts 1410F on relay 1410. Using the hand set of the telephone the customer will now record any message he desires.

After he has completed the message he operates the # signal to record the # tone which is used for midcycle shift in the answer/record arrangement or alternately he operates no button. When no tone is recorded the machine will not go into a midcycle shift. This arrangement is used in the answer only mode.

When the contact foil on the tape which is of the endless loop type again appears at the switch 1420 transistor 1401 is rendered nonconductive which will cause relay 1410 to restore. This in turn will cause relay 810 to restore. Motor 106 however will continue running with the discharge of capacitor 421 through resistor 431 to the base of transistor 412. In this manner the relaying sensing foil will again move past switch 1420 and cause relay 1410 to operate. The unit is now in the check function mode. During the check mode the just recorded announcement will be played back over the telephone line to the subscriber so he may verify that the announcement has been made correctly. As the machine drive motor 106 continues to advance the answer tape is moved forward and audio signals that have been recorded are picked up by pick up head 105, conducted to the input of the play amplifier 300, taken from the outputs thereof and applied to transformer 109 and back over the telephone line to the subscriber. The subscriber having verified the message has been correctly recorded simply hangs up and disconnects, wherein the machine will disconnect in the manner previously described.

Figure 18:
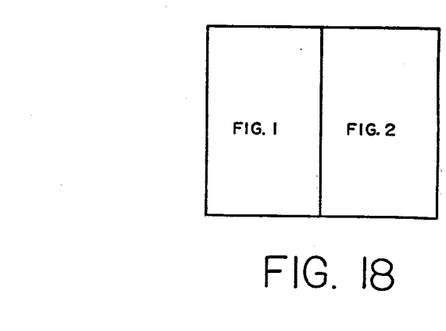

If it is desired the subject unit may be equipped with a voice control circuit (1800) which is associated with the time-out timer 1100 which keeps resetting the time-out timer as long as voice signals are present in the telephone line. The voice control circuitry of itself is conventional.

If the announcement contactor is for some reason inoperative, pulses are no longer available through diode 1023 of alarm circuit 1000 (FIG. 10) to keep the timer IC1020 reset. Comparator 1020 will operate and apply a signal to transistor 1022 which in turn will operate an alarm lamp 1021 on the unit and operate rela 1010. Relay 1010 will then extend this alarm condition to the telephonecentral office where it may be utilized in any practical manner. This alarm unit likewise could be used to monitor other functions of the unit.

It should be noted that if a subscriber using the machine is in the process of making an announcement or reviewing recorded messages, and an incoming call is received from the telephone central office, a ringing signal through capacitors 161 and 162 will be heard at the subscriber's instrument and accordingly by simply hanging up the hand set at the instrument, release will occur in the manner previously described causing relay 120 to restore and consequently allow the call from the telephone central office to be conducted over the MDF terminals to the subscriber line. In this manner emergency calls may be received as well as permitting the subscriber not to miss any calls during the playback or recall mode of operation.

While but a single embodiment of the present invention has been shown, it will be obvious to those skilled in the art that numerous modifications may be made without departing from the spirit and scope of the invention. It will be particularly obvious that only certain standard tone combinations have been employed for control of the circuitry of the present invention. In view of this it would be most obvious that additional features can be included within the tone decoding capability of the present equipment. Such additional features may include the provision of circuitry for turning the equipment "on" or "off" from the subscriber's instrument or remotely, or providing a fast forward mode of operation for the tape equipment.

I claim:

1. Telephone answering and recording apparatus, connected to a telephone switching system serving a plurality of subscribers and including ringing signal generating means, said telephone answering and recording apparatus including a playback medium connectible to said switching system and adapted for playback of announcement messages through said switching system to at least one of said subscribers, and ringing signal detection means connected to said switching system and to said playback medium, said ringing signal detection means comprising: an optical isolator including an input circuit connected to said switching system; counting means including a plurality of outputs, a predetermined one of said outputs connected to said playback medium; and a comparator circuit connected between said optical isolator and said counting means, and including a circuit connection to a source of reference potential; said optical isolator operated to conduct output signals to said comparator circuit in response to receipt of ringing signals generated in said switching system; said comparator circuit operated in response to each output signal from said optical isolator of higher potential than said connected reference potential, to transmit an advance signal to said counting means; said counting means advanced in response to each advance signal received from said comparator to provide an operate signal sequentially at each of said outputs, until an operate signal is transmitted over said predetermined output to said playback medium; said medium operated in response to said received operate signal to play back an announcement message through said switching system to at least one of said subscribers.

2. Telephone answering and recording apparatus as claimed in claim 1 wherein: there is further included rectifier means connected between said switching system and said optical isolator operated in response to said ringing signals to convert said ringing signals to direct current signals.

3. Telephone answering and recording apparatus as claimed in claim 1 wherein: there is further included filter means connected between said optical isolator and said comparator circuit operated to inhibit output signals from said optical isolator other than those produced by said optical isolator in response to receive ringing signals.

4. Telephone answering and recording apparatus as claimed in claim 1 wherein: there is further included pulse shaping means connected between said comparator circuit and said counting means operated to condition said advance signals from said comparator circuit to said counting means.

5. Telephone answering and recording apparatus as claimed in claim 4 wherein: said pulse shaping means comprise a Schmidt trigger circuit.

6. Telephone answering and recording apparatus as claimed in claim 1 wherein: there is further included timer means connected between said comparator means and said counting means operated in a first mode in response to each of said advance signals, and operated after a predetermined time in response to termination of said advance signals to clear said counting means.

7. Telephone answering and recording apparatus as claimed in claim 1 wherein: said counting means commprise a shift register.

* * * * *